United States Patent [19]

Gjelsvik et al.

[11] 4,297,326

[45] Oct. 27, 1981

[54] METHOD OF PRODUCING A PURE ALUMINIUMOXIDE FROM SOLUTIONS CONTAINING DISSOLVED IONS OF ALUMINIUM AND IRON

[75] Inventors: Norvald Gjelsvik, Oslo; Ingleif Hundere, Frogner, both of Norway

[73] Assignee: Elkem-Spigerverket a/s, Oslo, Norway

[21] Appl. No.: 118,601

[22] Filed: Feb. 4, 1980

[30] Foreign Application Priority Data

Feb. 13, 1979 [NO] Norway ................................. 790460

[51] Int. Cl.³ ............................................. C01F 7/22
[52] U.S. Cl. ................................... 423/126; 423/132; 423/495
[58] Field of Search ..................... 423/126, 495, 132

[56] References Cited

U.S. PATENT DOCUMENTS

| | | | |
|---|---|---|---|
| 558,725 | 4/1896 | Gooch | 423/126 |
| 2,752,223 | 6/1956 | Recue | 423/126 |
| 3,620,671 | 11/1971 | Maurel et al. | 423/132 |
| 4,110,399 | 8/1978 | Gaudernack et al. | 423/126 |
| 4,158,042 | 6/1979 | Deutschman | 423/126 |
| 4,177,242 | 12/1979 | Cohen et al. | 423/126 |

*Primary Examiner*—Herbert T. Carter
*Attorney, Agent, or Firm*—Eyre, Mann, Lucas & Just

[57] ABSTRACT

Method of producing aluminiumchloride with low contents of iron from solutions containing ions of aluminium and iron by precipitation of aluminiumchloride by means of hydrochloric gas where the solution from which the aluminiumchloride is precipitated contains at least 0.1 g Fe/l which solution has been formed by leaching of a natural mineral raw material or artifically produced aluminium-containing raw material by leaching with hydrochloric acid and/or sulphuric acid, respectively a mixture of such acids. The produced aluminiumchloride may be transformed to aluminiumoxide by calcination.

1 Claim, No Drawings

METHOD OF PRODUCING A PURE ALUMINIUMOXIDE FROM SOLUTIONS CONTAINING DISSOLVED IONS OF ALUMINIUM AND IRON

The present invention relates to production of pure aluminiumoxide from solutions which contain dissolved ions of aluminium and iron.

By production of aluminiumoxide from other raw materials than bauxite the aluminium contents of the raw material is often leached by means of acids, and usually there is employed one of the acids: hydrochloric acid, sulphuric acid or nitric acid, but use of other acids as well inorganic as organic ones has also been suggested. In most raw materials there are a series of impuring elements which also will be dissolved with aluminium by such leaching processes. Such an element is iron. By several reported methods where aluminiumoxide is produced from a mineral raw material by means of a first leaching of the raw material with acid, there is supplied a separate cleaning step in order to remove iron from the solutions before the aluminium is recovered from the solution after the leaching. It is then tried to remove the iron as completely as possible from the solution. By a known process the aluminium contents in clay is leached by sulphuric acid. A nitric acid is added and the iron is extracted by means of a liquid-liquid extraction process. The contents of iron is hereby brought down to below 0.01 g Fe/l, whereupon the aluminium contents is precipitated by addition of more hydrochloric acid gas. It has also been suggested processes in which it is tried to reduce the iron contents in solutions which contain aluminium before the precipitation of aluminium with hydrochloric acid gas. It is therefore surprising to find that it is possible to precipitate an aluminiumchloride with very low contents of iron by means of hydrochloric acid gas from solutions with a high content of dissolved iron, specially when the iron is present in the value $+3$. The contents of iron must however be adjusted if the solutions are to be recirculated, but by allowing the concentration of iron to build up to an elevated level by repeated recirculations of the solution, there is obtained only a relatively small volume of solution which need to be treated in order to keep the concentration of iron on an acceptable level. It is also often easy to remove iron from a solution where it is only necessary to remove a part of the iron present and thus it is possible to maintain a relatively high concentration of iron in the solution. In particular, the iron ion content can be maintained above 0.1 grams per liter while obtaining a ferric chloride content below 0.05% in the precipitated aluminium chloride hexahydrate.

By tests in which aluminiumchloride has been precipitated from solutions with increasing amounts of iron is has been found that it is possible to produce from the mentioned aluminiumchloride an aluminiumoxide which contains below 0.05% $Fe_2O_3$. This is a result which can be accepted by production of aluminium-metal even when the aluminiumchloride is precipitated from solutions which contain above 100 g $Fe^{+3}$/l. This is due to the fact that iron and especially $Fe^{+3}$ will form chloride complexes which are soluble in strong hydrochloric acid, while aluminium does not form such complexes but will be precipitated as $AlCl_3.6H_2O$. This results primarily in that the iron will be maintained in solution and secondly that those big anion complexes which are formed will only have a small tendency to be built into the crystal lattice of the aluminium chloride. To be able to produce a pure aluminiumchloride from such solution with elevated contents of iron it is important to be able to remove the solid aluminiumchloride completely from the mother lye, for instance by effective cleaning. Further, the produced crystals of aluminiumchloride must not contain inclutions or pockets of occluded mother lye. This is obtained by carrying out the precipitation carefully so there is obtained as perfect crystals as possible.

EXAMPLE 1

A lye was produced by leaching out the aluminium contents from anorthosite containing 30% $Al_2O_3$ and 1% $Fe_2O_3$ by means of hydrochloric acid (6 N HCl). The lye contained 40 g Al/l and 2 g Fe/l. The aluminium contents was precipitated by supply of hydrochloric acid gas. The resulting chloride was washed with concentrated hydrochloric acid and calcined at 1000° C. whereby was obtained an oxide containing 0,01% $Fe_2O_3$. The mother lye from the precipitation was used for leaching of a new batch of anorthosite and there was obtained a new lye solution containing 40 g Al/l and 4 g Fe/l. The aluminium contents was then again precipitated with hydrochloric acid gas and it was possible to produce an aluminiumoxide containing 0,012% $Fe_2O_3$ by ignition of the chloride. The recirculation of the lye was continued without removing the iron whereby the concentration of the iron in the lye was increased.

Table 1 shows some examples of the iron contents in ready calcined aluminiumoxide produced from lyes with different contents of iron.

TABLE 1

| Iron in the lye, g Fe/l | 2 | 4 | 12 | 18 | 28 |
|---|---|---|---|---|---|
| Iron in aluminiumoxide % $Fe_2O_3$ in $Al_2O_3$ | 0.01 | 0.012 | 0.02 | 0.03 | 0.05 |

For aluminiumoxide which is to be used for production of aluminium metal a content of 0.05% $Fe_2O_3$ is usually considered as an acceptable low content of iron. It is thus by all the tests produced an aluminiumoxide with acceptable purity.

EXAMPLE 2

Tests were carried out in the same way as in example 1, but the hydrochloric acid was subsituted by sulphuric acid (7 N $H_2SO_4$). The dissolved aluminium was precipitated by means of hydrochloric acid gas. The excess of hydrochloric acid was subsequently removed by heating whereby the strength of the acid was adjusted back to about 5.5 N $H_2SO_4$ and 1.5 N HCl before leaching of another batch of anorthosite was started. Table 2 shows some examples of iron contents in oxide produced from lyes with varying contents of iron.

TABLE 2

| Iron in lye, g Fe/l | 2 | 8 | 18 | 32 |
|---|---|---|---|---|
| Iron in aluminiumoxide % $Fe_2O_3$ in $Al_2O_3$ | 0.01 | 0.02 | 0.04 | 0.06 |

EXAMPLE 3

Ashes after combustion of mineral coal was leached with hydrochloric acid. The lye which contained 20 g Al/l and 20 g Fe/l was saturated with hydrochloric acid gas and the aluminium contents was precipitated as aluminiumchloride from which there was produced an aluminiumoxide with 0.03% $Fe_2O_3$.

We claim:

1. A method of continuously producing hexahydrated aluminium chloride which on calcining forms an aluminium oxide with a ferric oxide content of less than 0.05% from an ore containing aluminium and iron constituents comprising:
   (a) treating a first quantity of said ore with sulfuric or hydrochloric acid or a mixture thereof to form a solution comprising aluminium and iron ions;
   (b) treating the solution of step (a) with hydrochloric acid gas to form a precipitate of hexahydrated aluminium chloride and to form a mother liquor containing iron ions;
   (c) treating a further quantity of said ore with said mother liquor to form a further solution comprising aluminium and iron ions, the iron ions being present in approximately the cumulative of their presence in the first and the further quantity of ore;
   (d) treating said further solution with hydrochloric acid gas to form a precipitate of hexahydrated aluminium chloride and to form a mother liquor containing iron ions;
   (e) continuing the treatment of further quantities of said ore in the manner of steps (c) and (d) and and with the amount of iron ions in said mother liquor being between 8 and 28 grams per liter; and
   (f) calcining the hexahydrated aluminium chloride to aluminium oxide with a ferric oxide content of less than 0.05%.

UNITED STATES PATENT AND TRADEMARK OFFICE
CERTIFICATE OF CORRECTION

PATENT NO. : 4,297,326
DATED : October 27, 1981
INVENTOR(S) : Norvald Gjelsvik et al.

It is certified that error appears in the above-identified patent and that said Letters Patent are hereby corrected as shown below:

Column 1, lines 50-54: Delete "In particular, the iron ion content can be maintained above 0.1 grams per liter while obtaining a ferric chloride content below 0.05% in the precipitated aluminium chloride hexahydrate."

Signed and Sealed this

Twenty-ninth Day of December 1981

[SEAL]

Attest:

Attesting Officer

GERALD J. MOSSINGHOFF

Commissioner of Patents and Trademarks